(12) United States Patent
Burghardt et al.

(10) Patent No.: US 10,862,137 B2
(45) Date of Patent: Dec. 8, 2020

(54) METHOD FOR PRODUCING A CURRENT COLLECTOR FOR A FUEL CELL, AND FUEL CELL

(71) Applicant: Robert Bosch GmbH, Stuttgart (DE)

(72) Inventors: Andreas Burghardt, Stuttgart (DE); Arne Huber, Boeblingen (DE); Daniel Simon, Stuttgart-Feuerbach (DE); Jens Burghaus, Gerlingen (DE); Juergen Oberle, Sindelfingen (DE); Witold Pieper, Renningen (DE); Maxim Smirnov, Dornstetten (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 16/319,551

(22) PCT Filed: Jul. 12, 2017

(86) PCT No.: PCT/EP2017/067533
§ 371 (c)(1),
(2) Date: Jan. 22, 2019

(87) PCT Pub. No.: WO2018/019586
PCT Pub. Date: Feb. 1, 2018

(65) Prior Publication Data
US 2019/0237774 A1 Aug. 1, 2019

(30) Foreign Application Priority Data
Jul. 25, 2016 (DE) .......................... 10 2016 213 537

(51) Int. Cl.
*H01M 8/0232* (2016.01)
*H01M 8/0202* (2016.01)
(Continued)

(52) U.S. Cl.
CPC ....... *H01M 8/0232* (2013.01); *H01M 4/8605* (2013.01); *H01M 8/0202* (2013.01); *H01M 8/0239* (2013.01); *H01M 8/0245* (2013.01)

(58) Field of Classification Search
CPC .. H01M 8/0202; H01M 8/023; H01M 8/0232; H01M 8/0241; H01M 8/0243;
(Continued)

(56) References Cited

U.S. PATENT DOCUMENTS 2,721,378 A * 10/1955 Oliver ..................... B22F 7/002
419/2
3,244,515 A * 4/1966 Horst ...................... B22F 7/002
419/2
(Continued)

FOREIGN PATENT DOCUMENTS

EP 0286127 10/1988
JP S6124151 A 2/1986
(Continued)

OTHER PUBLICATIONS

EPO website (www.espacenet.com) machine translation of the detailed description of JP 63171802A (Year: 1988).*
(Continued)

*Primary Examiner* — Gregg Cantelmo
(74) *Attorney, Agent, or Firm* — Michael Best & Friedrich LLP

(57) ABSTRACT

The invention relates to a method for producing a current collector (1) for a fuel cell. The method comprises the following steps: mixing a power-type or granulate-type base material (2) with a binding agent (3) and with fibres (4) in order to generate a material mixture (5), wherein the fibres (4) have a lower melting point and/or a lower chemical resistance than the base material (2); moulding a moulded body (6) from the material mixture (5); debinding the binding agent (3) from the moulded body (6); removing at least one portion of the fibres (4) from the moulded body (6); and sintering the moulded body (6). The invention also relates to a fuel cell having a current collector (1) that is produced by means of a method according to the invention.

15 Claims, 2 Drawing Sheets

(51) Int. Cl.
  *H01M 4/86*  (2006.01)
  *H01M 8/0239*  (2016.01)
  *H01M 8/0245*  (2016.01)
(58) Field of Classification Search
  CPC ............. H01M 8/0247; H01M 8/0239; H01M
    8/0245; H01M 4/8605; B22F 3/11; B22F
    3/1103; B22F 3/1118; B22F 3/1121;
    B22F 2003/1128; B22F 2003/1131; B22F
    1/0059; B22F 1/0062; B22F 1/007; B22F
    1/0074; B22F 1/0077; B22F 2001/0066
  USPC .......................................... 419/2, 24, 44–55
  See application file for complete search history.

(56) References Cited

U.S. PATENT DOCUMENTS

| | | | | |
|---|---|---|---|---|
| 3,854,994 A | * | 12/1974 | Binder | B05D 5/12 427/115 |
| 4,948,426 A | * | 8/1990 | Kato | B22F 1/0014 419/23 |
| 5,476,632 A | * | 12/1995 | Shivanath | C22C 33/0207 419/11 |
| 6,232,010 B1 | * | 5/2001 | Cisar | H01M 4/8605 429/465 |
| 2004/0142101 A1 | | 7/2004 | Eshraghi et al. | |
| 2006/0002810 A1 | * | 1/2006 | Grohowski, Jr. | B22F 3/1025 419/2 |
| 2015/0017464 A1 | * | 1/2015 | Tanaka | B22F 1/0014 428/566 |

FOREIGN PATENT DOCUMENTS

| | | | |
|---|---|---|---|
| JP | 63171802 A | * | 7/1988 |
| JP | H0656556 A | | 3/1994 |
| JP | 2004346411 A | * | 12/2004 |
| JP | 2006331743 A | | 12/2006 |
| WO | 2005004170 | | 1/2005 |

OTHER PUBLICATIONS

International Search Report for Application No. PCT/EP2017/067533 dated Nov. 16, 2017 (English Translation, 2 pages).

* cited by examiner

METHOD FOR PRODUCING A CURRENT COLLECTOR FOR A FUEL CELL, AND FUEL CELL

BACKGROUND OF THE INVENTION

Known fuel cells have a plurality of individual cells which are arranged above or next to one another in stacks, also known as "fuel cell stacks". To produce an electrical contact between the individual cells, fuel cell stacks have current collectors. Current collectors further serve in the passage of gases, such as for example oxygen and/or hydrogen, to the corresponding electrodes of the individual cells and in removing the water resulting from electrolysis and dissipating the heat of reaction of the electrodes from the individual cells.

To achieve these many and varied tasks, current collectors have to exhibit high corrosion resistance, good electrical and thermal conductivity and to permit good passage of water. Metal foams are therefore often used as current collectors. Various methods are known for producing such current collectors. According to a first method, a foam of an austenitic stainless steel, such as e.g. 316L, with a porosity adjusted to around 70% is used. The process is very complex to manage, and therefore the manufacturing costs amount to around ten times the cost of the materials. According to a second method, firstly a polyurethane foam (PU foam) is coated with a metal, in particular nickel (Ni), copper (Cu) or iron (Fe), for example using an electroplating method. Coating is followed by PU foam binder removal, which may take place for example by means of heating or burning away. The metal foam is finished by soft-annealing and subsequent cooling. In this second method too, the manufacturing costs amount to around ten times the cost of the materials.

SUMMARY OF THE INVENTION

A first aspect of the invention relates to a method for producing a current collector for a fuel cell. The method has the following steps:
  mixing a pulverulent or granular base material with a binder and with fibers for producing a material mixture, wherein the fibers have a lower melting point and/or a lower chemical resistance than the base material,
  shaping a shaped article from the material mixture,
  removing the binder from the shaped article,
  removing at least some of the fibers from the shaped article and
  sintering the shaped article.

According to the invention, a pulverulent or granular base material is mixed with a binder and with fibers. In this way, a material mixture of fibers, base material and binder is produced, which is also denoted "feedstock". Mixing proceeds for example in a mixing vessel designed for this purpose. Inexpensive production of the current collector is achievable using the described method, wherein in particular the porosity of the foam is controllable virtually as desired by way of the manufacturing process. The stated disadvantages of the prior art are thus at least partly or indeed completely overcome.

According to the invention, a pulverulent or granular base material is understood to mean a base material which is flowable. Such a base material for example has a plurality of base material particles. The base material for example comprises high-alloy steel, such as for example the austenitic stainless steel 316L or 17-4 PH, and/or nickel and/or titanium. The base material may also comprise copper and/or aluminum and/or low-alloy steel. With the latter base materials, it is preferred according to the invention for coating of the shaped article to take place after sintering, in order to passivate the base material. Coating may be carried out for example in liquid, electrolytic or gaseous manner. Electro-dipcoating, electroplating, phosphate coating, oxidation or the like are preferred for this purpose, for example. The base material may consist of a material or comprise a mixture of several materials, wherein the sinterability of the base material should be taken into account. Provision may for example be made according to the invention for the base material to comprise a plurality of different metals.

A base material without binder exhibits relatively poor shapeability and dimensional stability, since shaped geometries are readily destructible due to the flowability of the base material. The task of the binder is therefore to improve the shapeability or dimensional stability of the base material. The binder may be used to bind adjacent base material particles together, wherein the shapeability of the base material is retained. The binder preferably has a relatively high viscosity, so ensuring good shapeability and high dimensional stability even of complex geometries. Provision may be made according to the invention for the viscosity of the binder to reduce as the temperature increases. For geometries which do not require any plastic shaping, the powder may be pressed into shape with a very small proportion of binder and then sintered.

The fibers have a lower melting point and/or a lower chemical resistance and/or a lower decomposition temperature than the base material. A lower melting point has the advantage that, by heating to a temperature above the melting point of the fibers and below the melting point of the base material, the fibers may be dissolved out of the base material, leaving corresponding cavities. Lower chemical resistance has the advantage that the fibers may be dissolved out of the base material by means of a suitable solvent, which is designed for example to dissolve the fibers and does not attack the base material or does so only to a slight degree. A lower decomposition temperature has the advantage that the fibers decompose and leave in gaseous form during heating in the sintering furnace.

Provision may be made according to the invention for the fibers to be admixed with a mixture of base material and the binder. Alternatively, the fibers may also be mixed with the base material before the binder. In a further alternative of the method, the fibers may firstly be mixed with the binder and then with the base material.

A shaped article is then shaped from the material mixture. The shaped article then for example has the shape or substantially the shape of the current collector to be produced. The shaped article is preferably shaped such that the fibers are oriented parallel to one another or substantially parallel to one another. As a result of the parallel orientation of the fibers, the shaped article exhibits anisotropy, i.e. direction-dependent structure formation. The task of the fibers is to create regions which are free of base material and binder and thus form cavities. The advantage of this is that, after removal of the fibers, mutually parallel channels remain in the shaped article which are designed for example for water removal or the passage of oxygen. The binder guarantees the dimensional stability of the shaped article.

According to the invention, the binder is then removed from the shaped article. In this way, a brown compact may be produced from the shaped article. Binder removal here proceeds as a function of the selected binder and the selected base material. When removing the binder, it is additionally preferable to consider the fibrous material, such that the fibers are not damaged during removal. This has the advantage of preventing or at least reducing the deposition of residues of the binder in the channels formed by the fibers. During binder removal, the binder or the greater part of the binder is removed from the shaped article. A small proportion of the binder preferably remains between adjacent base material particles, in order so to ensure minimum dimensional stability of the shaped article.

In a further method step, at least some of the fibers are removed from the shaped article or brown compact. A major part of the fibers is preferably removed. Fiber removal may proceed for example by means of a solvent or by melting the fibers due to heating or by removal in gaseous form. Provision may be made for the binder removal and fiber removal to proceed simultaneously using the same measure. Provision may alternatively be made for the fibers to be removed by being burnt away, in particular during sintering of the brown compact. The removed fibers each leave a cavity behind them, which corresponds or substantially corresponds to the shape of the removed fiber.

In a further method step, the brown compact is sintered. During sintering, diffusion processes are initiated in the base material, such that adjacent base material particles form a bond with one another. Through cooling, for example to room temperature, the base material solidifies to form a solid porous structure. Sintering thus does not proceed to a maximum achievable final density, but rather the shaped article remains porous. The proportion by volume of porosity preferably amounts to at least 5% of the total volume of the base material content of the shaped article. Post-treatment, in particular mechanical post-treatment, of the sintered brown compact optionally takes place after sintering. During the post-treatment, the current collector may for example be separated from a current collector assembly. In addition, the current collector may be trimmed of flash and/or finished.

With the method according to the invention for producing a current collector, current collectors may be produced inexpensively using simple means. By using fibers in the production of the current collector, the latter comprises internal cavities or channels arranged parallel or substantially parallel to one another which are designed for passage of a fluid, in particular water and/or oxygen and/or hydrogen or the like. By suitably selecting the base material, the current collector comprises a high electrical and thermal conductivity and a high corrosion resistance.

According to a preferred configuration of the method, shaping is performed by means of sinter pressing and/or injection molding and/or a doctor blade and/or a 3D printing method. Doctor blading may preferably proceed according to the invention in that the base material powder is doctor-bladed into a press mold in multiple layers using the doctor blade, with the addition of a binder, wherein after each doctor-blading step, i.e. after the production of a doctor-bladed layer, the press mold is lowered by the thickness of one doctor-bladed layer. In this way, the horizontal orientation of the fibers is ensured. Once the press mold has been filled, the component is pressed and then sintered. With injection molding, doctor blading and 3D printing, the fibers may be arranged simply in such a way that they are oriented parallel or substantially parallel to one another. Thus, channels particularly suitable for passage of a fluid in one direction may be produced with simple means in the current collector.

It is preferable for fibers to be admixed as the fibers which comprise a fibrous material, and for a binder to be admixed which has at least two components, wherein at least one of the two components of the binder comprises a binder material. The fibrous material has a melting point which corresponds or at least substantially corresponds to a melting point of the binder material. Alternatively or in addition, the fibrous material has the same polarity as the binder material. The fibrous material more preferably corresponds to the binder material. The same or substantially the same melting point for fibrous material and binder material has the advantage of improving removal of the binder and removal of the fibers by means of heating and enabling said removal optionally to proceed simultaneously or substantially simultaneously. The same polarity of fibrous material and binder material has the advantage of improving removal of the binder and removal of the fibers by means of a solvent, provided the solvent has the same polarity as the fibrous material and binder material. There is thus no need for a plurality of different solvents. In this way, the manufacturing costs of the current collector may be further reduced.

Fibers are preferably used as the fibers which have a fiber length of between 5 mm and 100 mm Particularly preferably, the fibers have a fiber length of between 10 mm and 20 mm. Such fibers are inexpensive to provide and are well suited to parallel orientation and to forming channels for the passage of fluids.

In one advantageous configuration of the method, a binder comprising at least two components is mixed as the binder, wherein a polymer is used as the first component of the binder and a wax is used as the second component of the binder. Such binders are particularly suitable for the shapeability and dimensional stability of the material mixture and may be easily removed using known methods, such as for example heating or the admixture of a solvent.

It is preferred according to the invention for the binder and/or the fibers to be removed at a temperature of between 500° C. and 700° C. It is further preferred for the binder and/or the fibers to be removed at a temperature of around 600° C. At these temperatures a preferred binder may be removed in a liquid state with particularly low viscosity and thus easily from the shaped article. At these temperatures there is no risk of the base material starting to melt or indeed melting.

Provision may be made according to the invention for the binder and/or the fibers to be removed using a solvent. A solvent has the advantage that the shaped article does not have to be exposed to heat. Furthermore, removal of the dissolved binder or of the dissolved fibers by the solvent can be achieved particularly reliably.

The shaped article is preferably shaped in strip form and thus has a plurality of current collector shaped articles arranged adjacent one another and joined together. To produce a predefined shape of current collector, one part is separated from the strip-form shaped article. Separation preferably takes place prior to sintering, since in this state significantly less energy is needed for separation than after sintering. Separation after sintering has the advantage, on the other hand, that the risk of damage to the shaped article is significantly reduced in the case of the sintered component due to its robust structural cohesion. Strip-form shaping can be simply performed and enables advantageous utilization of a workspace. Furthermore, strip-form shaping is particularly suitable for inexpensive continuous assembly line production.

It is preferable for the sintering to take place at a temperature of between 1100° C. and 1500° C., in particular between 1250° C. and 1350° C. A particularly preferred sintering temperature is 1300° C. At such temperatures current collectors may be readily produced from preferred base materials with a porosity of over 5%.

A second aspect of the invention relates to a fuel cell. The fuel cell has at least one anode, at least one cathode, at least one electrolyte arranged between anode and cathode and at least one current collector. The at least one current collector is produced by means of a method according to the invention. The fuel cell has the same advantages as were described above with regard to the method for producing a current collector for a fuel cell. The fuel cell may accordingly be produced inexpensively using simple means. By using fibers in the production of the current collector, the latter comprises internal cavities or channels arranged parallel or substantially parallel to one another which are designed for passage of a fluid, in particular water and/or oxygen and/or hydrogen or the like. By suitable selection of the base material, the current collector has a high electrical and thermal conductivity primarily perpendicular to the preferred direction of flow defined by the microchannels, and high corrosion resistance.

BRIEF DESCRIPTION OF THE DRAWINGS

The invention is explained in greater detail below with reference to the schematic drawings, in which respectively.

DETAILED DESCRIPTION

Figure 1:
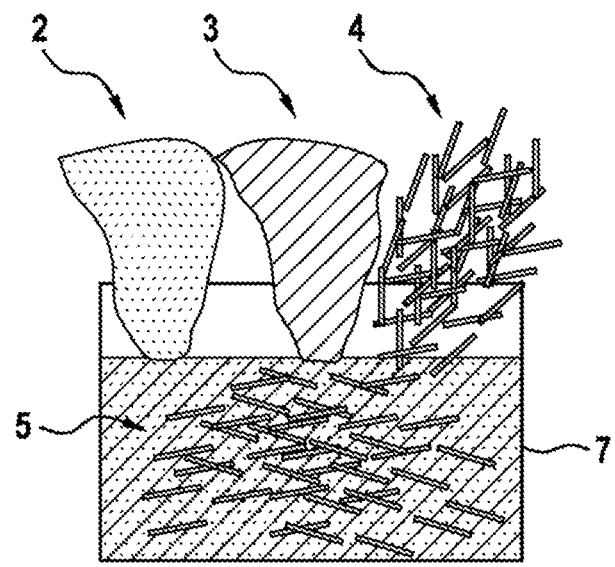
FIG. 1 is a side view of the mixing using the method according to the invention.

FIG. 1 is a schematic representation of mixing a base material 2 with a binder 3 and fibers 4 in a mixing vessel 7, in side view. A material mixture 5 is thus created in the mixing vessel 7 in which the fibers 4 are randomly arranged and are surrounded by base material 2 and binder 3.

Figure 2:
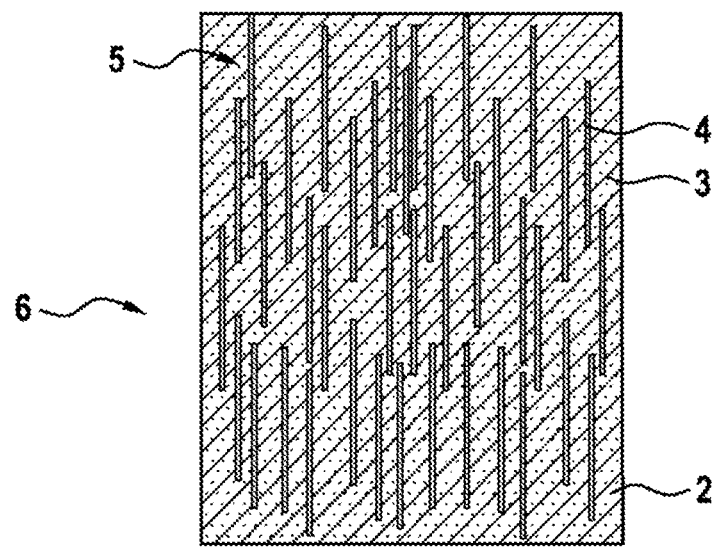
FIG. 2 is a plan view of a shaped article after shaping.

FIG. 2 is a schematic representation of a shaped article 6 which has been shaped from the material mixture 5 using the method according to the invention, e.g. using a doctor blade. The manner in which shaping is performed results in the fibers 4 being oriented parallel to one another, such that the shaped article 6 exhibits anisotropy. The base material 2 and the fibers 4 are bound together in a dimensionally stable manner by the binder 3 in such a way as to prevent spontaneous collapse of the shaped article 6. In this representation the fibers 4 each have a fiber length which is less than the length of the shaped article 6. Alternatively, the fiber length may correspond or substantially correspond to the shaped article length.

Figure 3:
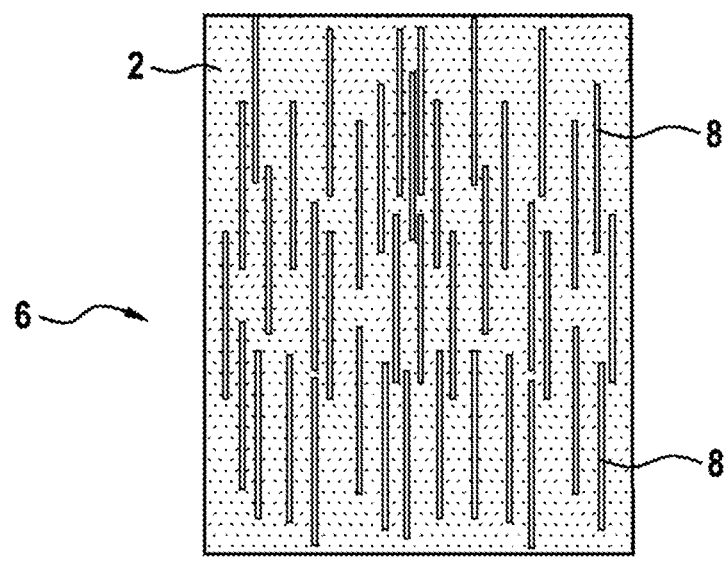
FIG. 3 is a plan view of the shaped article after removal of binder and fibers and FIG. 4 is a plan view of a current collector produced using the method according to the invention.

In FIG. 3 the shaped article 6 of FIG. 2 is shown after binder removal, i.e. removal of the excess binder 3, and removal of the fibers 4, in schematic plan view. At those points where the fibers 4 were previously arranged (cf. FIG. 2), mutually parallel cavities in the form of channels 8 are now arranged, which are designed for the passage of fluids, such as e.g. water, oxygen or the like. In this representation, the channels 8 each have a channel length which is less than the length of the shaped article. Alternatively, the channel length may correspond or substantially correspond to the shaped article length.

Figure 4:
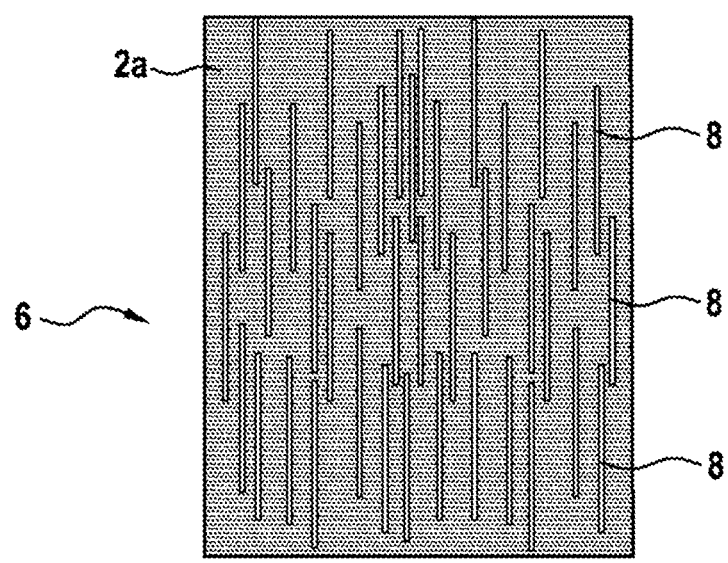

FIG. 4 is a schematic representation in plan view of a current collector 1 produced using the method according to the invention. The base material 2 has been sintered into a metal foam 2a by the sintering process. The metal foam 2a thus exhibits significantly greater dimensional stability than the shaped article 6.

The invention claimed is:

1. A method for producing a current collector (1) for a fuel cell, the method having the steps of:
   mixing a pulverulent or granular base material (2) with a binder (3) and with fibers (4) to produce a material mixture (5), wherein the fibers (4) have a lower melting point than the base material (2),
   shaping a shaped article (6) from the material mixture (5),
   removing the binder (3) from the shaped article (6),
   removing at least some of the fibers (4) from the shaped article (6), and
   sintering the shaped article (6),
   characterized in that the fibers (4) are admixed and comprise a fibrous material, and the binder (3) is admixed and has at least two components, wherein at least one of the two components of the binder (3) comprises a binder material, wherein the fibrous material has a melting point which corresponds or at least substantially corresponds to a melting point of the binder material.

2. The method as claimed in claim 1, characterized in that the shaping is performed by means of sinter pressing and/or injection molding and/or a doctor blade and/or a 3D printing method.

3. The method as claimed in claim 1, characterized in that the fibers (4) have a fiber length of between 5 mm and 100 mm.

4. The method as claimed in claim 1, characterized in that a binder comprising at least two components is mixed as the binder (3), wherein a polymer is used as the first component of the binder (3) and a wax is used as the second component of the binder (3).

5. The method as claimed in claim 1, characterized in that the binder (3) and/or the fibers (4) is/are removed at a temperature of between 500° C. and 700° C.

6. The method as claimed in claim 1, characterized in that the binder (3) and/or the fibers (4) is/are removed using a solvent.

7. The method as claimed in claim 1, characterized in that the shaped article (6) is shaped in strip form and, to produce a predefined shape of current collector (1), one part is separated from the strip-form shaped article (6).

8. The method as claimed in claim 1, characterized in that the sintering takes place at a temperature of between 1100° C. and 1500° C.

9. A method for producing a fuel cell with at least one anode, at least one cathode, at least one electrolyte arranged between anode and cathode and at least one current collector, characterized in that the at least one current collector (1) is produced using the method as claimed in claim 1.

10. The method as claimed in claim 1, characterized in that the sintering takes place at a temperature of between 1250° C. and 1350° C.

11. The method as claimed in claim 1, characterized in that the fibers (4) have both a lower melting point and a lower chemical resistance than the base material (2).

12. A method for producing a current collector (1) for a fuel cell, the method having the steps of:
   mixing a pulverulent or granular base material (2) with a binder (3) and with fibers (4) to produce a material mixture (5), wherein the fibers (4) have a lower melting point than the base material (2),
   shaping a shaped article (6) from the material mixture (5),
   removing the binder (3) from the shaped article (6), removing at least some of the fibers (4) from the shaped article (6), and sintering the shaped article (6), characterized in that a binder comprising at least two components is mixed as the binder (3), wherein a polymer is used as the first component of the binder (3) and a wax is used as the second component of the binder (3).

13. A method for producing a current collector (1) for a fuel cell, the method having the steps of:

mixing a pulverulent or granular base material (2) with a binder (3) and with fibers (4) to produce a material mixture (5), wherein the fibers (4) have a lower chemical resistance than the base material (2), shaping a shaped article (6) from the material mixture (5), removing the binder (3) from the shaped article (6), removing at least some of the fibers (4) from the shaped article (6), and sintering the shaped article (6), characterized in that the fibers (4) are admixed and comprise a fibrous material, and the binder (3) is admixed and has at least two components, wherein at least one of the two components of the binder (3) comprises a binder material, wherein the fibrous material has the same polarity as the binder material.

14. A method for producing a current collector (1) for a fuel cell, the method having the steps of:

mixing a pulverulent or granular base material (2) with a binder (3) and with fibers (4) to produce a material mixture (5), wherein the fibers (4) have a lower chemical resistance than the base material (2), shaping a shaped article (6) from the material mixture (5), removing the binder (3) from the shaped article (6), removing at least some of the fibers (4) from the shaped article (6), and sintering the shaped article (6), characterized in that a binder comprising at least two components is mixed as the binder (3), wherein a polymer is used as the first component of the binder (3) and a wax is used as the second component of the binder (3).

15. The method as claimed in claim 14, characterized in that a binder comprising at least two components is mixed as the binder (3), wherein a polymer is used as the first component of the binder (3) and a wax is used as the second component of the binder (3).

* * * * *